(12) United States Patent
Dabak et al.

(10) Patent No.: US 6,975,684 B1
(45) Date of Patent: Dec. 13, 2005

(54) DYNAMIC SLAVE FREQUENCY SELECTION FOR IMPROVING UPLINK FREQUENCY HOPPING WIRELESS COMMUNICATIONS

(75) Inventors: Anand G. Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 702 days.

(21) Appl. No.: 09/634,819

(22) Filed: Aug. 8, 2000

Related U.S. Application Data

(60) Provisional application No. 60/185,939, filed on Feb. 29, 2000.

(51) Int. Cl.[7] .................. H04L 27/28; H04L 27/04; H04L 27/06; H04O 7/00; H04O 7/20
(52) U.S. Cl. ............... 375/260; 375/295; 375/316; 370/329; 455/450
(58) Field of Search ................. 375/259, 260, 375/316, 225, 132–136, 130, 159, 295; 370/329, 370/330; 455/450, 513, 509, 510

(56) References Cited

U.S. PATENT DOCUMENTS

| | | | |
|---|---|---|---|
| 5,506,863 A | * | 4/1996 | Meidan et al. .............. 375/134 |
| 5,802,110 A | * | 9/1998 | Watanabe et al. ........... 375/259 |
| 5,832,026 A | * | 11/1998 | Li ............................... 375/136 |
| 5,953,325 A | * | 9/1999 | Willars ........................ 370/335 |
| 6,169,761 B1 | * | 1/2001 | Marcoccia et al. ......... 375/132 |
| 6,535,563 B2 | * | 3/2003 | Tiedemann et al. ......... 375/344 |
| 6,549,784 B1 | * | 4/2003 | Kostic et al. ................ 455/501 |
| 6,553,064 B1 | * | 4/2003 | Chen et al. .................. 375/224 |

FOREIGN PATENT DOCUMENTS

EP  01130858 A2 *  9/2001

OTHER PUBLICATIONS

"Networks for Homes", Amitava Dutta-Roy, IEEE Spectrum, Dec. 1999, pp. 26-33.

* cited by examiner

*Primary Examiner*—Tesfaldet Bocure
(74) *Attorney, Agent, or Firm*—Ronald O. Neerings; Wade James Brady, III; Frederick J. Telecky, Jr.

(57) ABSTRACT

In wireless communications between a frequency hopping master device (M) and a frequency hopping slave device ($S_1$), the slave-to-master transmission frequency can be dynamically selected from a plurality of previous master-to-slave transmission frequencies (33) based on quality measures of those master-to-slave frequencies.

35 Claims, 6 Drawing Sheets

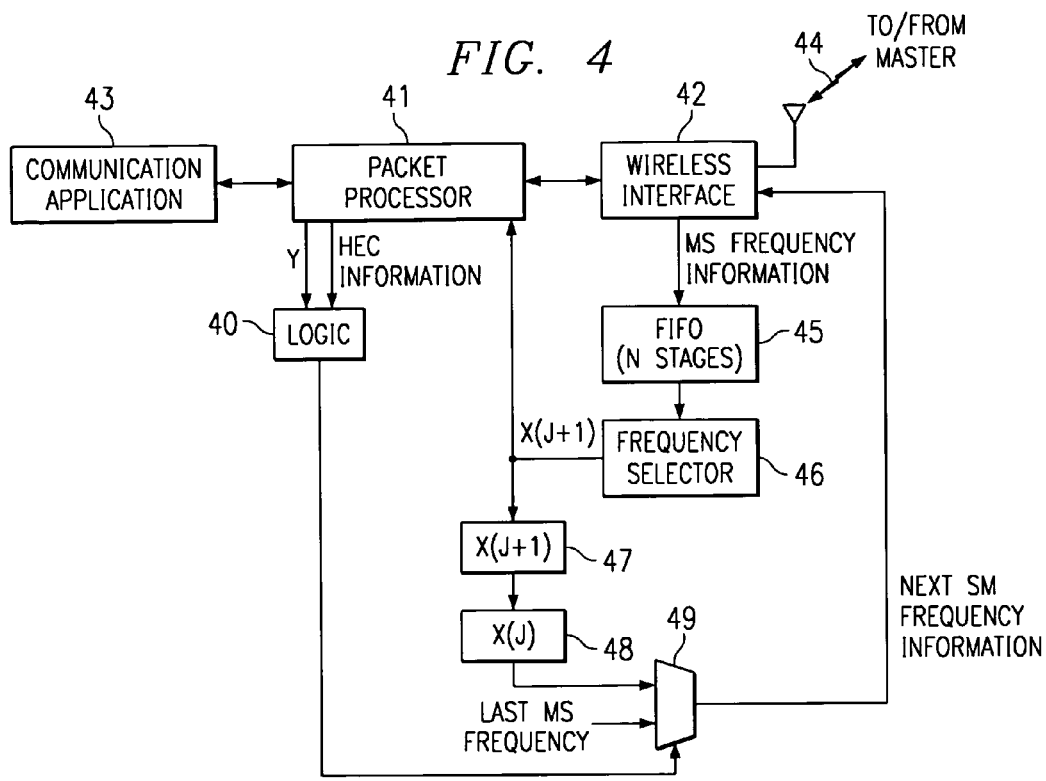
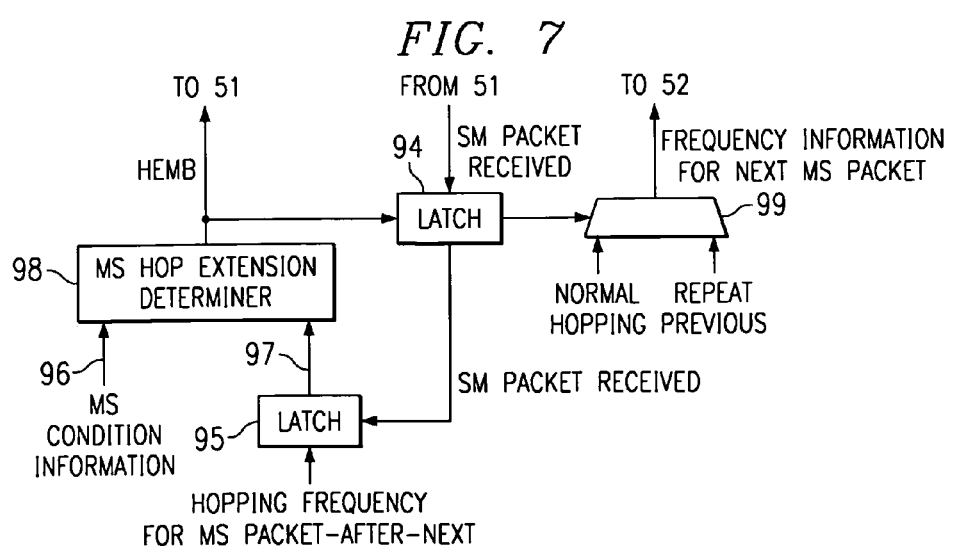

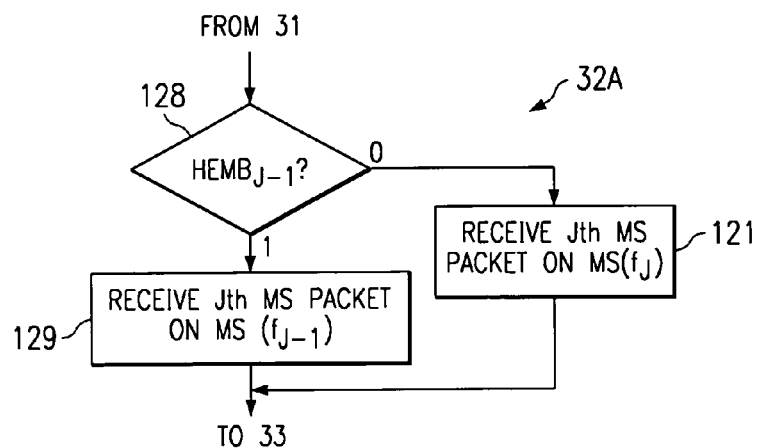
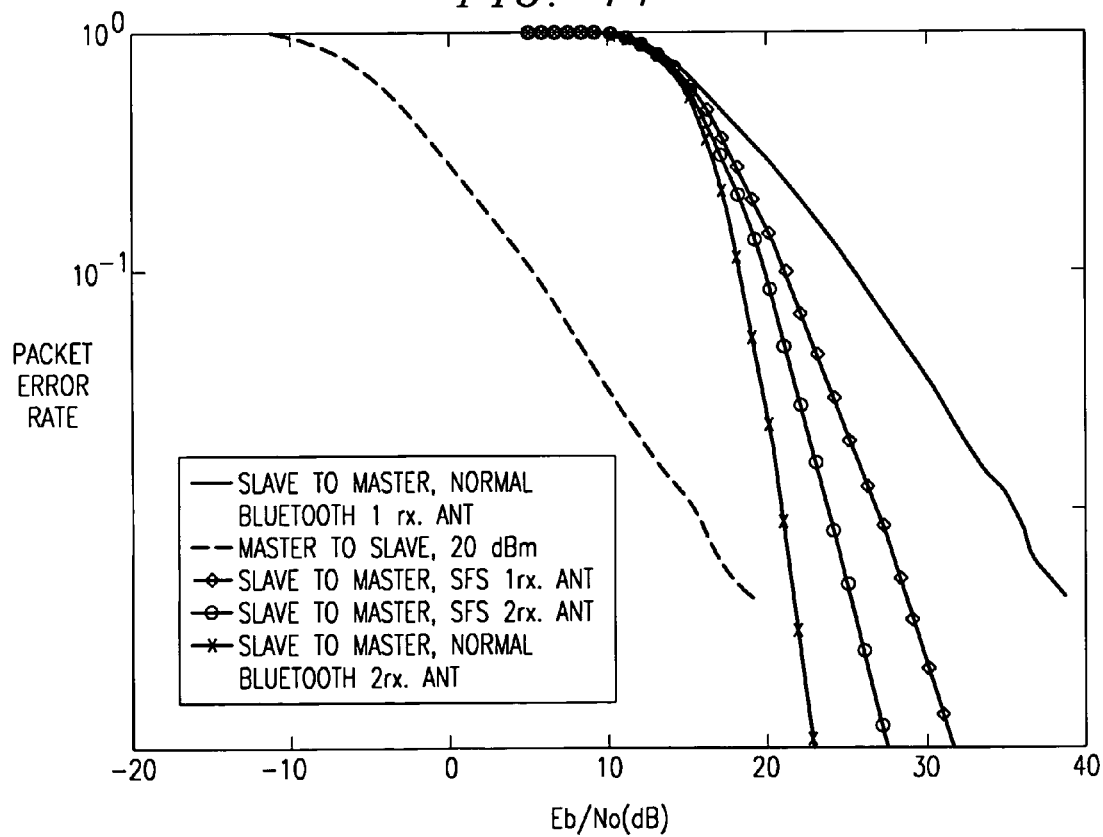

DYNAMIC SLAVE FREQUENCY SELECTION FOR IMPROVING UPLINK FREQUENCY HOPPING WIRELESS COMMUNICATIONS

This application claims the priority under 35 U.S.C. 119(e)(1) of U.S. provisional application No. 60/185,939, filed on Feb. 29, 2000.

FIELD OF THE INVENTION

The invention relates generally to wireless communications and, more particularly, to wireless communications that utilize frequency hopping techniques.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scattemets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHZ channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In some Bluetooth applications, the master could be an access point (AP) which can afford to transmit at, for example, a 20 dBm power level, while the slave could be a mobile unit with strict power consumption limitations that permit it to transmit only at a substantially lower power level, for example 0 dBm. One conventional example of such a communications system is a cordless telephone system wherein the master is the base unit and the slaves are the mobile phone units. In the exemplary system specified above, there would be an imbalance between the master-to-slave link (i.e., the downlink) and the slave-to-master links (i.e., the uplinks). Considering now a voice application such as the aforementioned cordless telephone system, even when using a receive diversity antenna at the master, such a system would achieve a 10 dB diversity gain with selection diversity. Thus, there would still be a 10 dB power imbalance between the downlink and the uplink transmissions. This situation is illustrated in FIG. 1.

The example of FIG. 1 assumes no retransmissions in either direction, because it is typically desired to conserve power consumption both for reception and transmission at the slave. Also, if the master employs some form of transmission diversity, this would further increase the imbalance between uplink and downlink.

It is desirable in view of the foregoing to compensate for power imbalances such as described above, in order to balance the uplink and downlink.

According to the present invention, the uplink slave-to-master transmission frequency can be dynamically selected from a plurality of previous downlink master-to-slave transmission frequencies based on quality measures thereof, which produces improved uplink performance and thereby advantageously reduces imbalances between the uplink and downlink.

BRIEF DESCRIPTION OF THE DRAWINGS

FIG. 4 diagrammatically illustrates pertinent portions of exemplary embodiments of a slave device which can perform the slave operations of FIG. 3.

FIG. 7, when taken in combination with FIG. 5, diagrammatically illustrates pertinent portions of an exemplary embodiment of a master device which supports both selection of slave frequencies and extension of the master frequency hopping pattern according to the present invention.

FIG. 10, when taken in combination with FIG. 3, illustrates exemplary operations which can be performed by the slave device embodiment of FIGS. 4 and 9.

FIG. 11 diagrammatically illustrates exemplary simulation results obtained using dynamic slave frequency selection techniques according to the invention.

DETAILED DESCRIPTION

According to the present invention, a slave monitors the previous N frequency transmissions from the master, and selects one of those N frequencies for the next slave-to-master transmission. Information indicative of the selected frequency is included in the slave's current transmission to the master. The frequency that the slave selects from the N monitored frequencies can be, for example, the monitored frequency that is best according to predetermined selection criteria. The selection criteria can be, for example, one or more conventionally available channel quality measurements.

Figure 1:
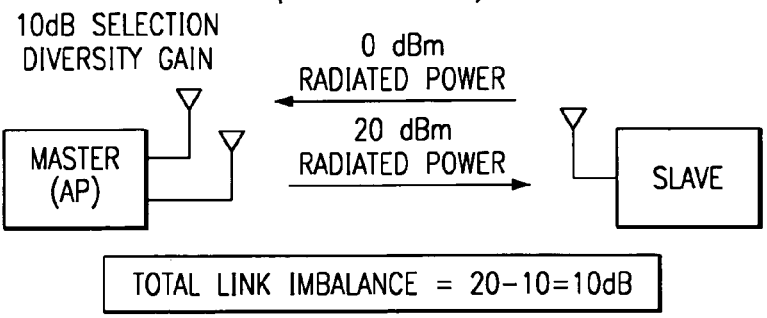
FIG. 1 diagrammatically illustrates a power imbalance condition that can occur in conventional wireless communication systems.
Figure 2:
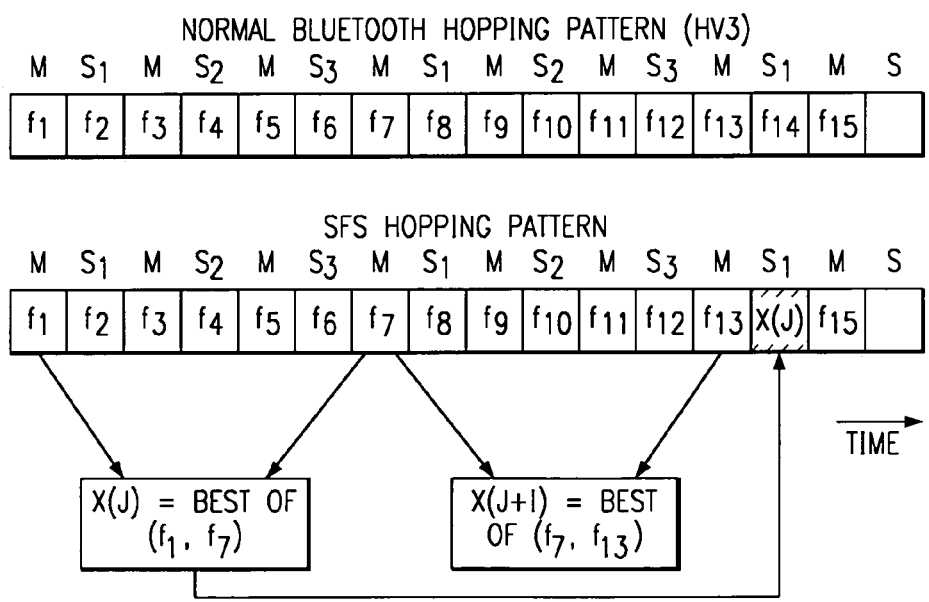
FIG. 2 diagrammatically illustrates an example of a slave frequency selection technique according to the present invention.

FIG. 2 diagrammatically illustrates one example of a slave frequency selection (SFS) scheme according to the invention. The example of FIG. 2 relates to Bluetooth HV3 (High-quality Voice) communication, and slave frequency selection is implemented by the slave device $S_1$, with N=2. Slave device $S_1$ monitors the previous N frequency transmissions from the master M, namely the transmissions on frequencies $f_1$ and $f_7$. Based on desired selection criteria, the slave $S_1$ selects the best frequency from among the monitored frequencies $f_1$ and $f_7$. The selected best frequency is designated as X(J) in FIG. 2. After having selected frequency X(J), the slave device $S_1$ transmits to the master on frequency $f_8$ information indicative of the selected frequency X(J). Thus, the master M knows that the next transmission from slave $S_1$ will be on frequency X(J). This frequency X(J) is then used for the next transmission from slave $S_1$ to the master instead of frequency $f_{14}$ which would otherwise be dictated for slave $S_1$ by the normal frequency hopping pattern. The transmission from slave $S_1$ on frequency X(J) will also include information indicative of X(J+1), which is the best of the previous N frequency transmissions from the master, namely $f_7$ and $f_{13}$. Thus, after slave $S_1$ transmits on frequency X(J), the master knows that the next transmission from slave $S_1$ will be on frequency X(J+1).

If the master M correctly receives the transmission from slave $S_1$ on frequency $f_8$, then the master knows that the next transmission from slave $S_1$ will be on frequency X(J). If the master does not correctly receive the $f_8$ transmission from slave $S_1$, then the master indicates in its next transmission to slave $S_1$, namely in the master transmission on frequency $f_{13}$ that the next transmission from slave $S_1$ to the master is to use the most current master-to-$S_1$ frequency, namely frequency $f_{13}$. In some embodiments, the master can direct slave $S_1$ to transmit next on frequency $f_7$, namely the most recent of the monitored frequencies.

Figure 3:
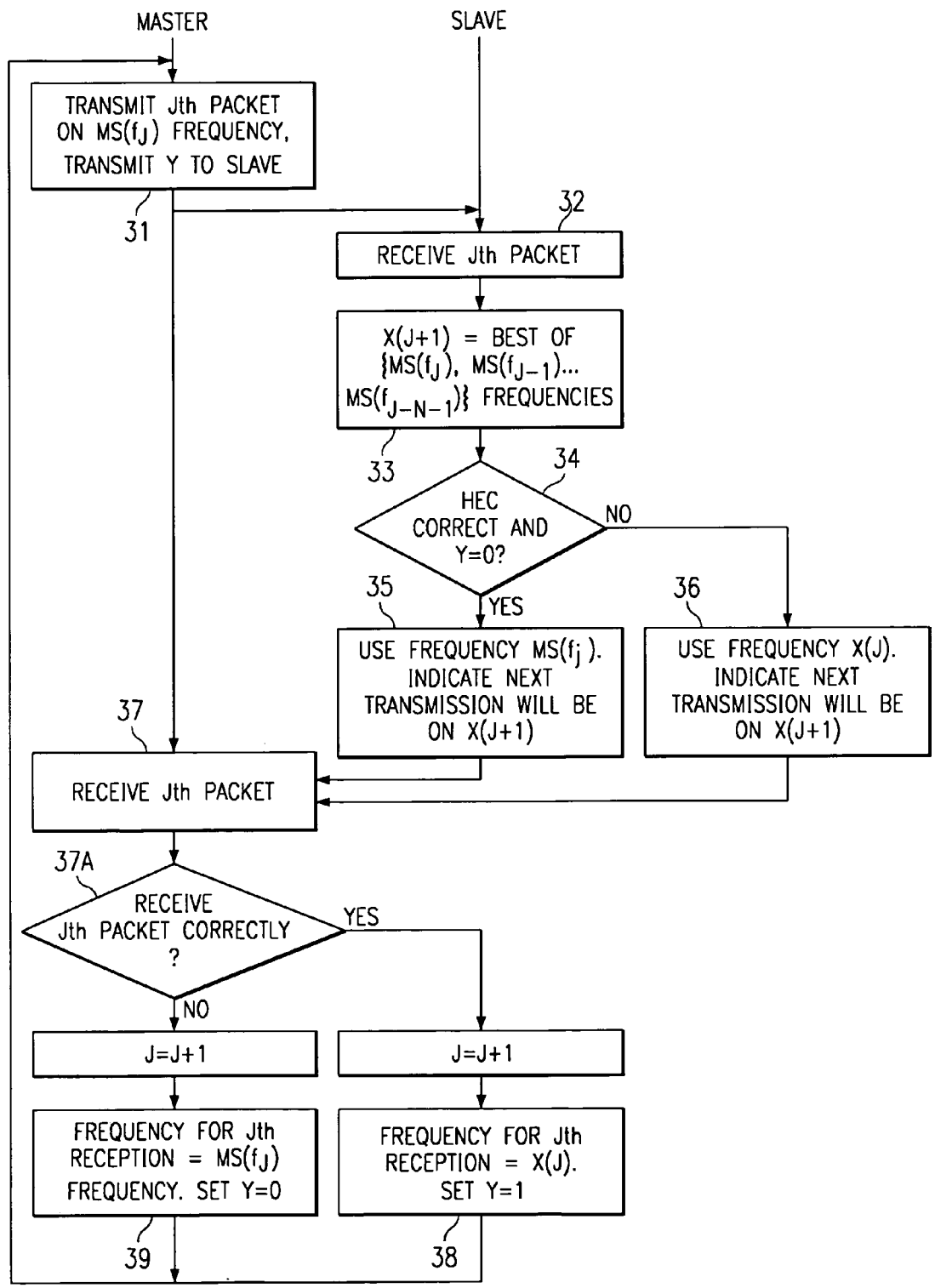
FIG. 3 illustrates exemplary operations which can be performed by the master and slave devices to implement the slave frequency selection technique of FIG. 2.

FIG. 3 illustrates exemplary operations which can be performed by master and slave devices to implement the slave frequency selection scheme illustrated in FIG. 2. The master transmits the Jth packet on the corresponding frequency in the master's normal frequency hopping pattern, which corresponding frequency is designated as $MS(f_J)$ in FIG. 3. A bit Y is included in the Jth packet. The bit Y (which can be initially set to a value of 0) indicates to the slave whether or not slave frequency selection has been overruled by the master. After the Jth master-to-slave packet is received by the slave at 32, the slave selects at 33 the best of the previous N master transmission frequencies $MS(f_J)$, $MS(f_{J-1})$, ... $MS(f_{J-N-1})$ according to any desired selection criteria. The selected frequency is designated as X(J+1) in FIG. 3. It is thereafter determined at 34 whether the conventional header error correction (HEC) information is correct and whether the value of Y (as received in the Jth master-to-slave packet) is 0. If the HEC information is correct and Y=0, then at 35 the slave device uses the most recent master-to-slave frequency, namely $MS(f_J)$ to transmit the Jth slave-to-master packet. This Jth slave-to-master packet includes information which indicates to the master that the next transmission from the slave will be on frequency X(J+1). On the other hand, if at 34 either the HEC information is incorrect or Y=1, then at 36 the slave device uses frequency X(J) to transmit the Jth slave-to-master packet. This Jth slave-to-master packet includes information indicating that the next slave-to-master transmission will be on frequency X(J+1). As can be seen from the foregoing description, the master sets Y=0 when the master wants to overrule slave frequency selection, and otherwise sets Y=1.

The frequency X(J+1) can be completely identified in the Jth slave-to-master packet using $\log_2(N)$ bits. For example, if four master transmission frequencies are monitored by the slave (N=4), then the frequency X(J+1) can be represented by two bits.

If it is determined at 37 that the Jth slave-to-master packet has been received correctly at the master, then, after incrementing the index J, the master notes at 38 that the frequency X(J) will be used to receive the next (the Jth) slave-to-master packet. Also at 38, the master sets Y=1. On the other hand, if at 37 the Jth slave-to-master packet has not been received correctly, then, after the index J is incremented, the master at 39 notes that the next (the Jth) slave-to-master packet will be received on the same frequency (namely $MS(f_J)$) that will be used at 31 to transmit the next (Jth) master-to-slave packet. Also at 39, the master sets Y= 0. After the frequency for receiving the Jth slave-to-master packet has been determined at 38 or 39, the above-described operations at 31–39 are repeated.

FIG. 4 illustrates pertinent portions of exemplary embodiments of a slave device which can perform the slave operations illustrated in FIG. 3. The slave device of FIG. 4 could be provided, for example, in a mobile phone unit in a Bluetooth cordless phone system. Other examples of the slave device include a wireless headset, a palm computer, and the other slave devices specified above. The slave device of FIG. 4 includes a packet processor 41 coupled between a wireless communications interface 42 and a communications application 43. The packet processor 41 receives communication information from the communications application 43, and can use conventional techniques to assemble the communication information into suitable packets. The packet processor 41 forwards the assembled packets to the wireless communication interface 42 which can use conventional techniques to transmit the packets across a wireless communication link 44 (e.g., a Bluetooth radio link) to a master device. Similarly, packets from the master received at the wireless communication interface 42 via the wireless communication link 44 are conventionally processed by the wireless communication interface and forwarded to the packet processor 41, which in turn disassembles the packets and provides the resulting communication information to the communications application 43. The above-described cooperation among the packet processor 41, the wireless communication interface 42 and the communications application 43 to support bidirectional packet communication with the master over the wireless communication link 44 is conventional and well known to workers in the art.

According to the present invention, an N-stage FIFO register 45 receives from the wireless communication interface and stores therein conventionally available information indicative of the quality of the last N master-to-slave (MS) frequencies on which the master has transmitted to the slave device. A frequency selector 46 has an input connected to the register 45 for receiving therefrom the quality information for the last N master-to-slave transmission frequencies. Based on the quality information received from the FIFO register 45, the frequency selector 46 selects the best of the last N master-to-slave frequencies. Examples of conventionally available quality information on which the frequency selection can be based include RSSI (received signal strength indicator) or the Bluetooth sync word correlation value. Information indicative of the selected frequency (e.g., X(J+1) from FIGS. 2 and 3) is output from the frequency selector 46, and is stored in a current selected frequency register 47. The previous contents of the current selected frequency register 47 (e.g., X(J) from FIGS. 2 and 3) are at this time shifted into a previous selected frequency register 48. The output X(J+1) is also provided to the packet processor 41 to be included in the next outgoing slave-to-master packet.

A selector 49 has an output which provides to the wireless communication interface 42 information indicative of the frequency at which the next slave-to-master (SM) packet is to be transmitted. The selector 49 has a control input coupled to the output of logic 40 whose inputs are provided by the packet processor 41. More specifically, one input to logic 40 is the HEC information associated with the most recently received master-to-slave packet, and the other input to logic 40 is the bit Y (see FIG. 3) from the most recently received master-to-slave packet. The logic 40 determines whether the HEC information is correct and Y=0. If so, then the logic 40 controls the selector 49 appropriately to instruct the wireless communication interface 42 that the frequency of the most recently received master-to-slave packet ($MS(f_j)$ in FIG. 3) will also be used for transmission of the next slave-to-master packet.

On the other hand, if the HEC information is incorrect, or if Y is not equal to 0, then the logic 40 controls selector 49 such that information indicative of the frequency X(J) is provided from the register 48 to the wireless communications interface 42 via the selector 49. Thus, X(J) in register 48 indicates to the wireless interface 42 which of the N previous MS frequencies is selected as the next SM frequency.

Figure 5:
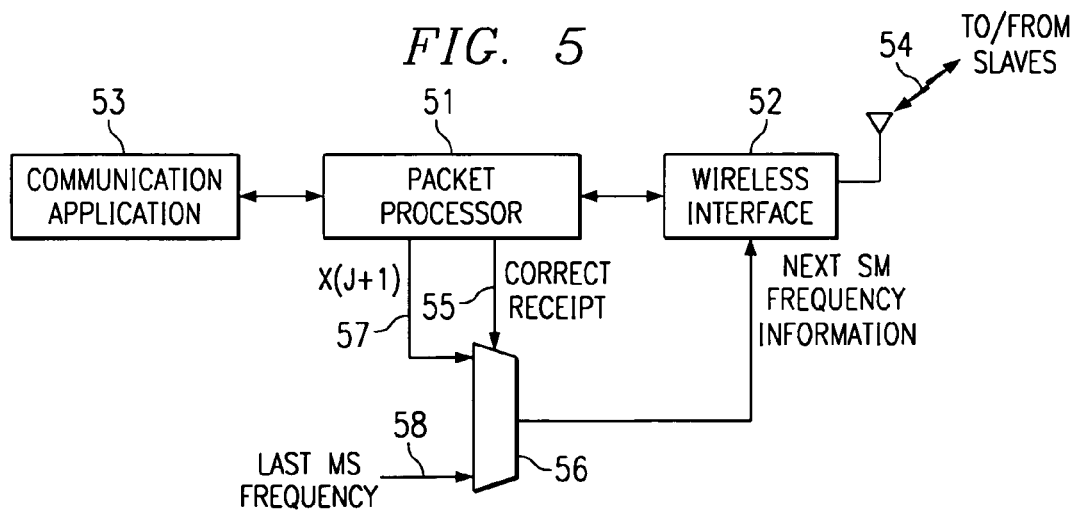
FIG. 5 diagrammatically illustrates pertinent portions of exemplary embodiments of a master device that can perform the master operations of FIG. 3.

FIG. 5 diagrammatically illustrates pertinent portions of exemplary embodiments of a master device which can perform the master operations illustrated in FIG. 3. The master device of FIG. 5 could be provided, for example, in the base unit of a Bluetooth cordless phone system. Other examples of the master device include a computer, an access point, a cell phone, and the other master devices mentioned above. The master device of FIG. 5 includes a packet processor 51 coupled between a wireless communications interface 52 and a communications application 53. The packet processor, wireless communication interface and communications application of FIG. 5 can cooperate in generally the same fashion as described above with respect to the packet processor 41, the wireless communication interface 42 and the communications application 43 of FIG. 4, in order to permit the master device of FIG. 5 to transmit and receive packets to and from slave devices (such as shown in FIG. 4) over the wireless communication link 54. According to the invention, the packet processor 51 includes an output 55 which indicates whether or not the current slave-to-master packet has been correctly received. This output 55 is coupled to a control input of a selector 56 which serves as a frequency indicator whose output provides to the wireless communication interface 52 information indicative of the frequency of the next slave-to-master packet. If the output 55 indicates that the most recent slave-to-master packet has not been correctly received, then the selector 56 passes to the wireless communication interface 52 the frequency (at 58) that was used to transmit the last master-to-slave packet. The packet processor 51 includes a further output 57 which provides information indicative of the frequency that has been selected by the slave for transmission of its next slave-to-master packet. This information corresponds to X(J+1) in FIGS. 2–4, and is applied to an input of the selector 56. The selector 56 provides the slave-selected frequency information X(J+1) to the wireless communication interface 52 if the packet processor output 55 indicates that the most recent slave-to-master packet has been correctly received.

The packet processor 51 inserts a value of Y=1 in the next master-to-slave packet if the most recent slave-to-master packet was correctly received at the master. Otherwise, the packet processor 51 inserts a value of Y=0 in the next master-to-slave packet.

FIG. 11 diagrammatically illustrates exemplary simulation results using slave frequency selection (SFS) according to the present invention with N=4 and a single, two antenna receiver at the master. In the example of FIG. 11, the performance comparison of the master-to-slave transmission (20 dBm) and the slave-to-master transmission (0 dBm) is made for conventional Bluetooth HV3 (High-quality Voice) on an SCO (Synchronous Connection-Oriented) link, with no interference. As shown in FIG. 11, using SFS can reduce the imbalance between the uplink and the downlink. Although an SCO link is used in FIG. 11, the SFS technique is also applicable to ACL (Asynchronous Connection-Less) links. SFS is also applicable at high Doppler (i.e., walking speed) conditions.

In the presence of strong interference, the use of SFS according to the present invention can actually produce an imbalance between uplink and downlink wherein the slave-to-master (uplink) performs better. For example, in the presence of microwave interference that is 10 MHZ wide with a 50% duty cycle, the master-to-slave link (downlink) would nominally have a packet error rate floor of 10/140=7%, while the slave-to-master link (uplink) using SFS with N=2 will achieve an error floor of 0.5%. Under these circumstances, it is desirable to improve the downlink master-to-slave performance to balance the links. An exemplary technique according to the invention for improving the downlink master-to-slave performance is illustrated in FIG. 6.

Figure 6:
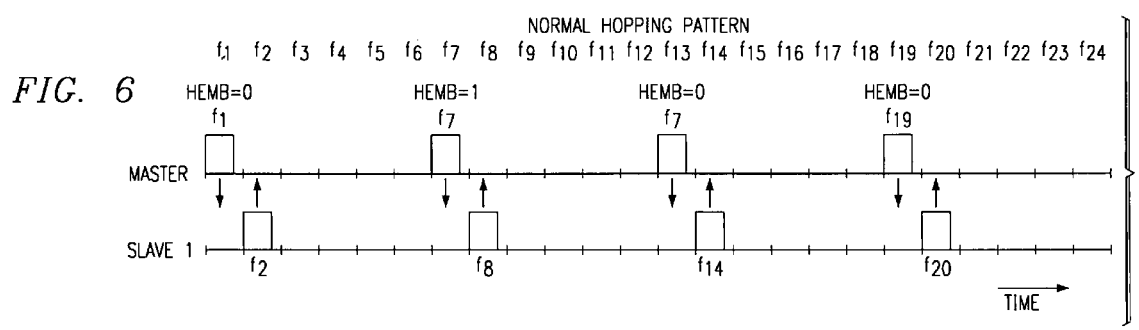
FIG. 6 diagrammatically illustrates an exemplary technique according to the present invention for dynamically extending the frequency hopping pattern of a master-to-slave link.

FIG. 6 diagrammatically illustrates an example of extending the frequency hopping pattern of a master-to-slave link according to the present invention. This hop extension for the master, also designated herein as HEM, can be advantageous in the presence of a strong interferer, for example a microwave oven. As shown in FIG. 6, the master transmits a hop extension for master bit (HEMB) which is indicative of the frequency that the master will use in its next transmission. If the master transmits HEMB=0, then the frequency of the master's next transmission will be the normal hopping frequency from its normal hopping frequency pattern. On the other hand, if the master transmits HEMB=1, this indicates that the master will repeat the frequency of the current transmission in its next transmission. In the example of FIG. 6, when the master is transmitting on frequency $f_7$, it knows that there will be interference on the next frequency $f_{13}$ in its normal hopping pattern, so the master transmits HEMB=1, thereby indicating to the slave that the current frequency $f_7$ will be used for the next master-to-slave transmission instead of frequency $f_{13}$ from the normal frequency hopping pattern. In this manner, the master can avoid a strong interferer on frequency $f_{13}$.

FIG. 7 diagrammatically illustrates exemplary additions to the master device illustrated in FIG. 5 to incorporate the HEM operation shown in FIG. 6. The packet processor 51 (see also FIG. 5) receives HEMB as in input, and inserts HEMB in the outgoing master-to-slave packets. Each time that a slave-to-master packet is received, the packet processor 51 outputs a slave-to-master (SM) packet received signal which clocks a latch 94 such that the HEMB transmitted in the most recent master-to-slave packet is latched through to the select input of a selector 99. The output of the selector 99 provides to the wireless interface 52 (see also FIG. 5) information indicative of the frequency at which the next master-to-slave packet is to be transmitted. Thus, by operation of the latch 94, the HEMB value that was included in the most recently transmitted master-to-slave packet is used to determine the frequency at which the next master-to-slave packet will be transmitted. If HEMB=0 in the most recently transmitted master-to-slave packet, then the selector 99 will indicate to wireless interface 52 that the normal hop frequency from the normal frequency hopping pattern will be used for transmission of the next master-to-slave packet. On the other hand, if HEMB=1 in the most recently transmitted master-to-slave packet, the selector 99 will indicate to the wireless interface 52 that the frequency at which the most recent master-to-slave packet was transmitted is to be repeated for transmission of the next master-to-slave packet.

The value of HEMB that will be transmitted in a given master-to-slave packet (and which will determine the frequency at which the next master-to-slave packet will be transmitted) is produced by a master-to-slave (MS) hop extension determiner 98. The determiner 98 includes inputs 96 and 97, and responds to these inputs to determine the value of HEMB. The input 96 receives information indicative of master-to-slave link conditions, for example information indicative of any strong interferers which may be operating on master-to-slave frequencies. Interference information, for example the frequency of interferers produced by a microwave oven, is typically readily available. The input 97 of the determiner 98 is coupled to the output of a latch 95 that is clocked by the SM packet received signal produced by the packet processor 51 when a new slave-to-master packet is received. Thus, the latch 95 is clocked together with the aforementioned latch 94. Consequently, at the same time that the latch 94 is clocked to select (via selector 99) the frequency at which the next master-to-slave packet will be transmitted, the latch 95 is clocked to apply to the input 97 of the determiner 98 information indicative of the normal hopping frequency for the master-to-slave packet-after-next.

Based on the normal hopping frequency for the packet-after-next received at 97, and also based on the master-to-slave link condition information received at 96, the determiner 98 determines the value of HEMB that will be transmitted in the next master-to-slave packet. This value of HEMB is indicative of the frequency at which the master-to-slave packet-after-next will be transmitted. For example, if the information received at 96 indicates that the normal hop frequency for the master-to-slave packet-after-next coincides with a strong interferer, then the determiner 98 outputs HEMB=1, which means that the frequency of the next master-to-slave packet transmission will also be used for the master-to-slave packet transmission-after-next. On the other hand, if the determiner 98 determines that the normal hopping frequency for the packet-after-next does not coincide with a strong interferer, then the determiner 98 outputs HEMB=0, which indicates that the packet-after-next will be transmitted at the normal hopping frequency.

Figure 8:
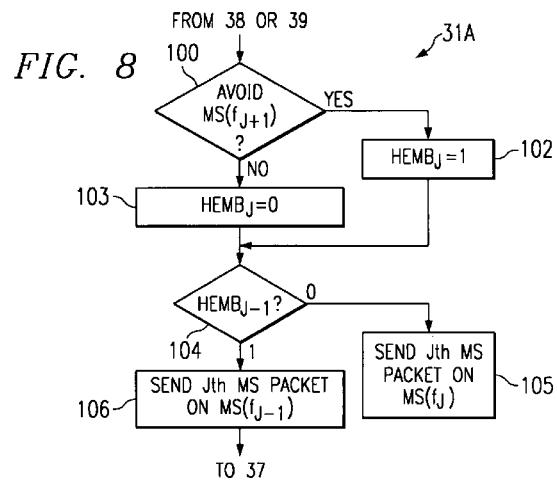
FIG. 8, when taken in combination with FIG. 3, illustrates exemplary operations which can be performed by the master device embodiment of FIGS. 5 and 7.

FIG. 8 illustrates exemplary operations 31A which can be performed by the master device of FIGS. 5 and 7 instead of the operations at 31 in FIG. 3. It is initially determined at 100 whether or not the normal hopping frequency associated with the (J+1)th packet, namely $MS(f_{J+1})$, is to be avoided, for example due to a conflict with a strong interferer. If the frequency $MS(f_{J+1})$ is to be avoided, then $HEMB_J$, namely the value of HEMB that will be sent with the Jth master-to-slave packet, is set equal to 1 at 102. Otherwise, $HEMB_J$ is set equal to 0 at 103. Thereafter, if $HEMB_{J-1}$, namely the value of HEMB that was sent with the (J−1)th master-to-slave packet, is 0 at 104, then the Jth master-to-slave packet (including Y and $HEMB_J$) is transmitted at 105 on the normal hopping frequency $MS(f_J)$ associated therewith. If $HEMB_{J-1}$ is equal to 1 at 104, then the Jth master-to-slave packet (including Y and $HEMB_J$) is transmitted at 106 on the frequency $MS(f_{J-1})$, namely the frequency at which the immediately preceding (the (J−1) th) master-to-slave packet was transmitted.

Figure 9:
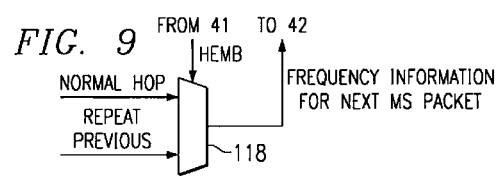
FIG. 9, when taken in combination with FIG. 4, diagrammatically illustrates pertinent portions of an exemplary embodiment of a slave device which supports both selection of slave frequencies and extension of the master frequency hopping pattern according to the invention.

FIG. 9 diagrammatically illustrates exemplary additions to the slave device illustrated in FIG. 4 to incorporate the HEM operation illustrated in FIG. 6. When disassembling a received master-to-slave packet, the packet processor 41 (see also FIG. 4) can output HEMB to a selector 118 which serves as a frequency indicator whose output provides to the wireless interface 42 information indicative of the frequency at which the next master-to-slave packet will be transmitted. If HEMB=0, then the selector 118 indicates that the normal hop frequency will be used for the next master-to-slave packet transmission. On the other hand, if HEMB=1, then the selector 118 indicates that the frequency that was used for the most recent master-to-slave packet transmission will be repeated for the next master-to-slave packet transmission.

FIG. 10 illustrates exemplary operations 32A which can be performed by the slave device of FIGS. 4 and 9 instead of the operations at 32 in FIG. 3. The value of $HEMB_{J-1}$, namely the value of HEMB that was sent in the (J−1)th master-to-slave packet, is inspected at 128. If $HEMB_{J-1}$=0, then the Jth master-to-slave packet is received at 121 on frequency $MS(f_J)$. On the other hand, if $HEMB_{J-1}$=1 at 128, then the Jth master-to-slave packet is received at 129 on frequency $MS(f_{J-1})$.

Figure 12:
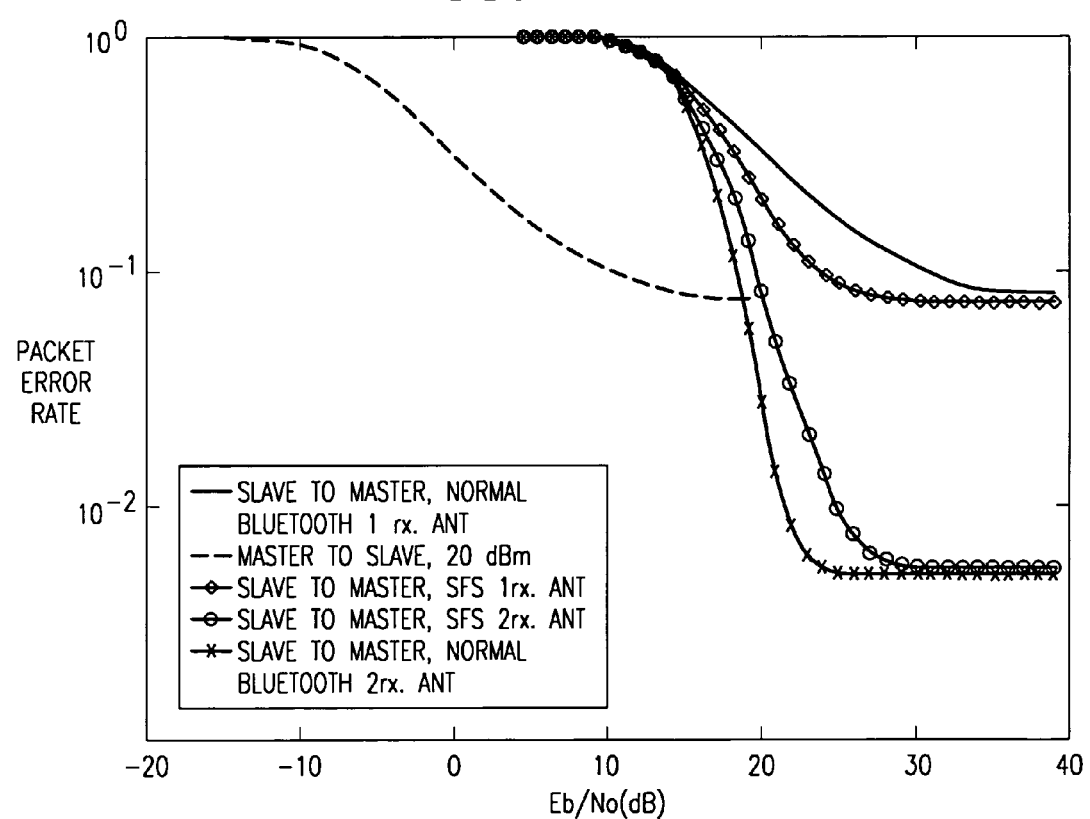
FIG. 12 diagrammatically illustrates exemplary simulation results obtained when dynamic slave frequency selection is combined with dynamic extension of the master hopping frequency pattern according to the invention.

FIG. 12 diagrammatically illustrates exemplary simulation results when SFS and HEM according to the invention are combined. In FIG. 12, the performance comparison of the master-to-slave transmission (20 dBm) and the slave-to-master transmission (0 dBm) is done for HV3 voice on an SCO link with 10 MHZ wide, 50% duty cycle microwave interference. As shown in FIG. 12, using SFS and HEM can reduce the imbalance between the uplink and downlink.

It will be evident to workers in the art that the embodiments described with respect to FIGS. 2–10 can be readily implemented, for example, by suitable modifications in software, hardware, or a combination of software and hardware, in conventional frequency hopping wireless communication devices such as Bluetooth masters and slaves.

Taking the Bluetooth protocol as an example, the bits corresponding to X(J+1), Y and HEMB can be included in Bluetooth packets by, for example, substituting them for existing bits or adding additional bits after the header.

Although exemplary embodiments of the invention are described above in detail, this does not limit the scope of the invention, which can be practiced in a variety of embodiments.

What is claimed is:

1. A method of controlling frequency hopping wireless communication between first and second frequency hopping wireless communication devices, comprising:
   the first device obtaining quality measurements respectively associated with frequencies that have been previously used by the second device to transmit information to the first device via a wireless communication link;
   the first device selecting, based on the quality measurements, one of the frequencies for transmission of a selected upcoming communication from the first device to the second device;
   the first device transmitting to the second device via the wireless communication link information indicative of the frequency that has been selected for transmission of the selected communication; and
   the second device transmitting information to the first device on the frequency selected by the first device if the second device received the transmission from the first device indicating the frequency selected for transmission of the communication and a frequency selected by the second device if the second device did not receive the transmission from the first device indicating the frequency selected for transmission.

2. The method of claim 1, including the first device obtaining a further plurality of quality measurements respectively associated with a further plurality of frequencies that have been used previously by the second device to transmit information to the first device via the wireless communication link, the first device selecting, based on the further plurality of quality measurements, one of said further plurality of frequencies for transmission of a further upcoming communication from the first device to the second device, and the first device using the frequency selected in the first-mentioned selecting step to transmit the selected communication to the second device via the wireless communication link and including within the selected communication information indicative of the frequency that has been selected for transmission of the further communication.

3. The method of claim 1, wherein the selected frequency is a frequency other than a normal frequency normally specified for the selected communication by a frequency hopping pattern associated with the first device.

4. The method of claim 1, wherein the first device and the second device are, respectively, Bluetooth slave and master devices.

5. The method of claim 1, including the first device transmitting the selected communication on the selected frequency, and the second device receiving the selected communication on the selected frequency.

6. The method of claim 1, wherein the frequency selected by the first device is the best available frequency according to a predetermined selection criteria.

7. The method of claim 1, wherein the frequency selected by the second device is the most current second device to first device frequency.

8. The method of claim 1, wherein the second device can overrule the frequency selection made by the first device.

9. A method of controlling frequency hopping wireless communication between first and second frequency hopping wireless communication devices, comprising:
   the first device obtaining quality measurements respectively associated with frequencies that have been previously used by the second device to transmit information to the first device via a wireless communication link;
   the first device selecting, based on the quality measurements, one of the frequencies for transmission of a selected upcoming communication from the first device to the second device; and
   the first device transmitting to the second device via the wireless communication link information indicative of the frequency that has been selected for transmission of the selected communication and the second device transmitting to the first device via the wireless communication link a request for the first device to transmit the selected communication on a frequency other than the frequency selected by the first device for transmission of the selected communication.

10. The method of claim 9, wherein said step of transmitting a request includes the second device using said frequency other than the selected frequency to transmit the request.

11. The method of claim 9, including, responsive to said request, the first device using said frequency other than the selected frequency for transmission of the selected communication unless a predetermined condition exists, and if so, the first device using the selected frequency for transmission of the selected communication.

12. The method of claim 11, including the first device detecting, based on said request transmitting step, whether the predetermined condition exists.

13. The method of claim 12, wherein said detecting step includes the first device detecting whether error detection information associated with said request is incorrect, and wherein the predetermined condition exists when the error detection information associated with said request is incorrect.

14. The method of claim 9, including the second device determining that the information indicative of the selected frequency has not been received correctly at the second device, said step of transmitting a request including the second device transmitting the request in response to a determination that the information indicative of the selected frequency has not been received correctly.

15. A method of controlling frequency hopping wireless communication between first and second frequency hopping wireless communication devices, comprising:
   the first device obtaining quality measurements respectively associated with frequencies that have been previously used by the second device to transmit information to the first device via a wireless communication link;

the first device selecting, based on the quality measurements, one of the frequencies for transmission of a selected upcoming communication from the first device to the second device;

the first device transmitting to the second device via the wireless communication link information indicative of the frequency that has been selected for transmission of the selected communication; and the second device determining that a first frequency of a frequency hopping pattern associated with transmissions by the second device is better than a second frequency of the frequency hopping pattern for transmission of a further selected communication from the second device to the first device via the wireless communication link, wherein the second frequency is specified by the frequency hopping pattern for the further selected communication and the first frequency is specified by the frequency hopping pattern for a communication from the second device to the first device that most closely precedes the further selected communication and, responsive to said determining step, the second device using said most closely preceding communication and the first frequency to inform the first device that the second device will deviate from the frequency hopping pattern and use the first frequency for transmission of the further selected communication instead of the second frequency and, responsive to said informing step, the first device receiving the further selected communication via the wireless communication link on the first frequency.

16. The method of claim 15, wherein said determining step includes considering information indicative of potential interference at the first frequency and at the second frequency.

17. The method of claim 16, wherein said determining step includes determining that an interferer is operating at the second frequency.

18. A frequency hopping wireless communication apparatus, comprising:

a frequency selector having an input for receiving quality measurements associated with frequencies that have been previously used to receive, via a wireless communication link, information transmitted by a further frequency hopping wireless communication apparatus, said frequency selector operable for selecting, based on said quality measurements, one of said frequencies for transmission of a selected upcoming communication to the further apparatus; and a wireless communication interface coupled to said frequency selector for transmitting to the further apparatus via the wireless communication link information indicative of the frequency that has been selected for transmission of the selected communication and for receiving information transmitted to said wireless communication apparatus via the selected frequency, if the further apparatus received the transmission from the wireless communication apparatus indicating the frequency selected for transmission of the communication, and a frequency selected by the further apparatus if the further apparatus did not receive the transmission from the wireless communication apparatus indicating the frequency selected for transmission of the communication.

19. The apparatus of claim 18, vided as a Bluetooth slave device.

20. The apparatus of claim 18, provided in a mobile phone unit of a cordless phone system.

21. The apparatus of claim 18, wherein the frequency selected by the wireless communication apparatus is the best available frequency according to a predetermined selection criteria.

22. The method of claim 18, wherein the frequency selected by the further apparatus is the most current second device to wireless communication apparatus device frequency.

23. The method of claim 18, wherein the further apparatus can overrule the frequency selection made by the wireless communication apparatus.

24. A frequency hopping wireless communication apparatus, comprising:

a frequency selector having an input for receiving quality measurements associated with frequencies that have been previously used to receive, via a wireless communication link, information transmitted by a further frequency hopping wireless communication apparatus, said frequency selector operable for selecting, based on said quality measurements, one of said frequencies for transmission of a selected upcoming communication to the further apparatus; and a wireless communication interface coupled to said frequency selector for transmitting to the further apparatus via the wireless communication link information indicative of the frequency that has been selected for transmission of the selected communication and operable for receiving from the further apparatus via the wireless communication link a request to transmit the selected communication on a frequency other than the frequency that has been selected for transmission of the selected communication.

25. The apparatus of claim 24, wherein said wireless communication interface is further for receiving said request on said frequency other than the selected frequency.

26. The apparatus of claim 24, including logic having an input coupled to said wireless communication interface for receiving therefrom said request, said logic having a further input for receiving information indicative of whether a predetermined condition exists, said logic operable for determining that said frequency other than the selected frequency should be used for transmission of the selected communication unless said predetermined condition exists, said logic operable for determining that the selected frequency should be used for transmission of the selected communication if said predetermined condition exists.

27. The apparatus of claim 26, wherein said information indicative of whether a predetermined condition exists includes information indicative of whether error detection information associated with said request is incorrect, and wherein said predetermined condition exists when the error detection information associated with said request is incorrect.

28. A frequency hopping wireless communication apparatus, comprising:

a frequency selector having an input for receiving quality measurements associated with frequencies that have been previously used to receive, via a wireless communication link, information transmitted by a further frequency hopping wireless communication apparatus, said frequency selector operable for selecting, based on said quality measurements, one of said frequencies for transmission of a selected upcoming communication to the further apparatus;

a wireless communication interface coupled to said frequency selector for transmitting to the further apparatus via the wireless communication link information indicative of the frequency that has been selected for transmission of the selected communication, wherein said wireless communication interface is further for receiving from the further apparatus via the wireless communication link information indicative of a determination by the further apparatus that a first frequency of a frequency hopping pattern associated with transmissions by the further apparatus is better than a second frequency of the frequency hopping pattern for transmitting a further selected communication from the further apparatus to said apparatus via the wireless communication link, wherein the second frequency is specified by the frequency hopping pattern for the further selected communication and the first frequency is specified by the frequency hopping pattern for a communication from the further apparatus to said apparatus that most closely precedes the further selected communication, and including an indicator coupled to said wireless communication interface and responsive to said information indicative of said determination for indicating to said wireless communication interface that the further apparatus will deviate from the frequency hopping pattern and use the first frequency for transmission of the further selected communication instead of the second frequency.

29. A frequency hopping wireless communication apparatus, comprising:

a wireless communication interface for receiving via a wireless communication link from a further frequency hopping wireless communication apparatus information indicative of a frequency that has been selected for transmission of a selected communication from the further apparatus to said apparatus, said frequency having been selected by the further apparatus from a plurality of frequencies based on quality measurements respectively associated with said frequencies, said frequencies having been previously used by said apparatus to transmit information to the further apparatus via the wireless communication link; and an indicator coupled to said wireless communication interface and responsive to said information for indicating to the wireless communication interface that the selected frequency is to be used for receiving the selected communication via the wireless communication link if the wireless communication interface received the selected frequency from the further apparatus, and a frequency selected by the wireless communication apparatus if the wireless communication apparatus did not receive the transmission from the further apparatus.

30. The apparatus of claim 29, including a determiner for determining that a first frequency of a frequency hopping pattern associated with transmissions by said apparatus is better than a second frequency of the frequency hopping pattern for transmission of a further selected communication to the further apparatus via the wireless communication link, wherein the second frequency is specified by the frequency hopping pattern for the further selected communication and the first frequency is specified by the frequency hopping pattern for a communication to the further apparatus that most closely precedes the further selected communication, said wireless communication interface coupled to said determiner and responsive to a determination that the first frequency is better than the second frequency for using said most closely preceding communication and the first frequency to inform the further apparatus via the wireless communication link that the frequency hopping pattern will be deviated from in order to use the first frequency for transmission of the further selected communication instead of the second frequency.

31. The apparatus of claim 29, provided as a Bluetooth master device.

32. The apparatus of claim 29, provided in a base unit of a cordless phone system.

33. The apparatus of claim 29, wherein the frequency selected by the further apparatus is the best available frequency according to a predetermined selection criteria.

34. The method of claim 29, wherein the frequency selected by the further apparatus is the most current frequency hopping wireless communication apparatus to further apparatus frequency.

35. The method of claim 29, wherein the wireless communication apparatus can overrule the frequency selection made by the further apparatus.

* * * * *